US009909445B2

(12) United States Patent
Penda et al.

(10) Patent No.: US 9,909,445 B2
(45) Date of Patent: Mar. 6, 2018

(54) MONITORING A DYNAMIC PARAMETER SUCH AS TORQUE IN A ROTATIONAL SYSTEM (71) Applicant: United Technologies Corporation, Farmington, CT (US)

(72) Inventors: Allan R. Penda, Amston, CT (US); Justin R. Urban, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/033,828

(22) PCT Filed: Nov. 11, 2014

(86) PCT No.: PCT/US2014/065000
§ 371 (c)(1),
(2) Date: May 2, 2016

(87) PCT Pub. No.: WO2015/119689
PCT Pub. Date: Aug. 13, 2015

(65) Prior Publication Data
US 2016/0281528 A1      Sep. 29, 2016

Related U.S. Application Data

(60) Provisional application No. 61/905,589, filed on Nov. 18, 2013.

(51) Int. Cl.
*G06F 19/00*      (2011.01)
*F01D 21/00*      (2006.01)
(Continued)

(52) U.S. Cl.
CPC ............. *F01D 21/003* (2013.01); *F01D 5/02* (2013.01); *F01D 5/12* (2013.01); *F01D 15/12* (2013.01);
(Continued)

(58) Field of Classification Search
CPC ....... B64C 13/503; F01D 21/003; F01D 5/02; F01D 15/12; F01D 5/12; F01D 17/04; F01D 17/06; F01D 25/24; G01L 3/10
(Continued)

(56) References Cited

U.S. PATENT DOCUMENTS 4,080,823 A   3/1978  Stargardter
4,520,681 A   6/1985  Moore et al.
(Continued)

OTHER PUBLICATIONS

EP search report for EP14882011.1 dated Nov. 9, 2016.
(Continued)

*Primary Examiner* — Gertrude Arthur Jeanglaude
(74) *Attorney, Agent, or Firm* — O'Shea Getz P.C.

(57) ABSTRACT

A system is provided for a turbine engine. The system includes a rotor assembly and a monitoring system. The rotor assembly includes a plurality of rotor blades connected to a shaft. The monitoring system includes a processing system. This processing system is adapted to receive blade data indicative of a rotational position of at least a first of the rotor blades. The processing system is also adapted to process shaft data with the blade data to provide torque data indicative of a torque to which at least a portion of the rotor assembly is being subjected, where the shaft data is indicative of a rotational position of the shaft.

20 Claims, 5 Drawing Sheets

(51) Int. Cl.
*F01D 5/02* (2006.01)
*F01D 17/04* (2006.01)
*F01D 17/06* (2006.01)
*G01L 3/10* (2006.01)
*F01D 5/12* (2006.01)
*F01D 15/12* (2006.01)
*F01D 25/24* (2006.01)

(52) U.S. Cl.
CPC ............ *F01D 17/04* (2013.01); *F01D 17/06* (2013.01); *F01D 25/24* (2013.01); *G01L 3/10* (2013.01); *F05D 2220/32* (2013.01); *F05D 2220/36* (2013.01); *F05D 2240/24* (2013.01); *F05D 2240/60* (2013.01); *F05D 2260/40311* (2013.01); *F05D 2260/83* (2013.01); *F05D 2270/335* (2013.01)

(58) Field of Classification Search
USPC ................ 701/3, 100; 244/17.13; 416/198 A
See application file for complete search history.

(56) References Cited

U.S. PATENT DOCUMENTS

| | | | |
|---|---|---|---|
| 4,807,129 A * | 2/1989 | Perks | .................... B64C 13/503 244/17.13 |
| 5,067,355 A | 11/1991 | Witte | |
| 5,148,711 A | 9/1992 | Twerdochlib et al. | |
| 5,471,880 A | 12/1995 | Lang et al. | |
| 5,498,137 A | 3/1996 | El-Aini et al. | |
| 6,195,982 B1 | 3/2001 | Gysling et al. | |
| 6,785,635 B2 | 8/2004 | von Flotow | |
| 7,455,495 B2 | 11/2008 | Leogrande et al. | |
| 7,941,281 B2 | 5/2011 | Rai et al. | |
| 7,984,656 B2 | 7/2011 | Nicklous et al. | |
| 2006/0122798 A1 | 6/2006 | Teolis et al. | |
| 2009/0177363 A1 | 7/2009 | Kulczyk et al. | |
| 2010/0153031 A1 | 6/2010 | Russhard | |
| 2011/0041474 A1 | 2/2011 | Gerez et al. | |
| 2011/0098948 A1 | 4/2011 | Platt et al. | |
| 2011/0231171 A1 | 9/2011 | Jousselin | |
| 2011/0293403 A1 | 12/2011 | Badami | |
| 2012/0035861 A1 | 2/2012 | Hadley et al. | |
| 2013/0006541 A1 | 1/2013 | Kominsky | |
| 2013/0116937 A1 | 5/2013 | Calhoun et al. | |
| 2016/0102679 A1* | 4/2016 | Iwrey | ...................... F04D 19/02 416/32 |

OTHER PUBLICATIONS

Gendrich et al. A Spatial Correlation Technique for Estimating Velocity Fields Using Molecular Tagging Velocimetry (MTV), Experiments in Fluids, vol. 22, 1996, pp. 67-77.
EP search report for EP14882011.1 dated Nov. 29, 2017.

* cited by examiner

MONITORING A DYNAMIC PARAMETER SUCH AS TORQUE IN A ROTATIONAL SYSTEM

This application claims priority to PCT Patent Application No. PCT/US14/065000 filed Nov. 11, 2014 which claims priority to U.S. Patent Application No. 61/905,589 filed Nov. 18, 2013, which are hereby incorporated herein by reference in their entireties.

BACKGROUND OF THE INVENTION

1. Technical Field

This disclosure relates generally to a rotational system and, more particularly, to monitoring a dynamic parameter such as torque in the rotational system.

2. Background Information

Horsepower and efficiency of a rotor assembly of a turbine engine may be determined from rotational speed of and torque on a shaft of the rotor assembly using known methodologies. The rotational speed, for example, may be measured using a once per revolution sensor. The torque may be measured using a strain gauge mounted on the shaft. The torque may alternatively be measured with shaft sensors located at opposite ends of the shaft. These shaft sensors, for example, may monitor relative rotational positions of the respective shaft ends to determine shaft windup (e.g., torsional twisting), which is indicative of the torque on the shaft. Error of such systems that measure torque with a strain gauge or two shaft sensors, however, may increase as axial length of the shaft decreases and/or a stiffness of the shaft increases.

There is a need in the art therefore for an improved system for monitoring a dynamic parameter such as torque of a rotor assembly.

SUMMARY OF THE DISCLOSURE

According to an aspect of the invention, a system is provided for a turbine engine. The system includes a rotor assembly and a monitoring system. The rotor assembly includes a plurality of rotor blades connected to a shaft. The monitoring system includes a processing system. This processing system is adapted to receive blade data indicative of a rotational position of at least a first of the rotor blades. The processing system is also adapted to process shaft data with the blade data to provide torque data indicative of a torque to which at least a portion of the rotor assembly is being subjected, where the shaft data is indicative of a rotational position of the shaft.

According to another aspect of the invention, a monitoring system is provided for a rotor assembly that includes a plurality of rotor blades arranged around and connected to a shaft. The monitoring system includes a blade sensor and a processing system. The blade sensor provides blade data indicative of a rotational position of at least a first of the rotor blades. The processing system processes shaft data with the blade data to provide torque data indicative of a torque to which at least a portion of the rotor assembly is being subjected, where the shaft data is indicative of a rotational position of the shaft.

According to another aspect of the invention, a method is provided involving a rotor assembly that includes a plurality of rotor blades connected to a shaft. The method includes: (i) rotating the shaft and the rotor blades about a centerline of the shaft; (ii) receiving blade data indicative of a rotational position of at least a first of the rotor blades; and (iii) processing shaft data with the blade data to provide torque data indicative of a torque to which at least a portion of the rotor assembly is being subjected during operation, where the shaft data is indicative of a rotational position of the shaft.

The method may include processing the torque data to determine efficiency and/or power of the rotor assembly. The rotor blades may be configured as fan blades of a geared turbine engine in which the rotor assembly is included.

The processing system may be adapted to determine an estimated time of arrival for the first of the rotor blades from the shaft data. The processing system may also be adapted to determine an actual time of arrival for the first of the rotor blades from the blade data.

The processing system may be adapted to compare the estimated time of arrival with the actual time of arrival to provide the torque data. The torque may be directly proportional to a difference between the estimated time of arrival and the actual time of arrival.

The processing system may process the shaft data to determine an estimated time of arrival for the first of the rotor blades. The processing system may process the blade data to determine an actual time of arrival for the first of the rotor blades. The processing system may compare the estimated time of arrival with the actual time of arrival to determine the torque data.

The processing system may be adapted to process the torque data to determine efficiency and/or horsepower of the rotor assembly.

The system may include a gear train connected to the rotor assembly. The shaft may transfer the torque from the gear train to the rotor blades.

The monitoring system may include a shaft sensor that provides the shaft data. The shaft sensor may be located at an interface between the shaft and the gear train.

The monitoring system may include a non-contact sensor that provides the shaft data.

The monitoring system may include a once per revolution sensor that provides the shaft data.

The monitoring system may include a memory in which the shaft data is stored.

The monitoring system may include a blade sensor that provides the blade data.

The system may include a case that houses the rotor blades. The blade sensor may be mounted with the case.

The blade sensor may be configured as or otherwise include a non-contact sensor.

The blade sensor may be configured as or otherwise include a blade tip time of arrival sensor.

The rotor blades may be configured as fan blades of the turbine engine.

The foregoing features and the operation of the invention will become more apparent in light of the following description and the accompanying drawings.

DETAILED DESCRIPTION OF THE INVENTION

Figure 1:
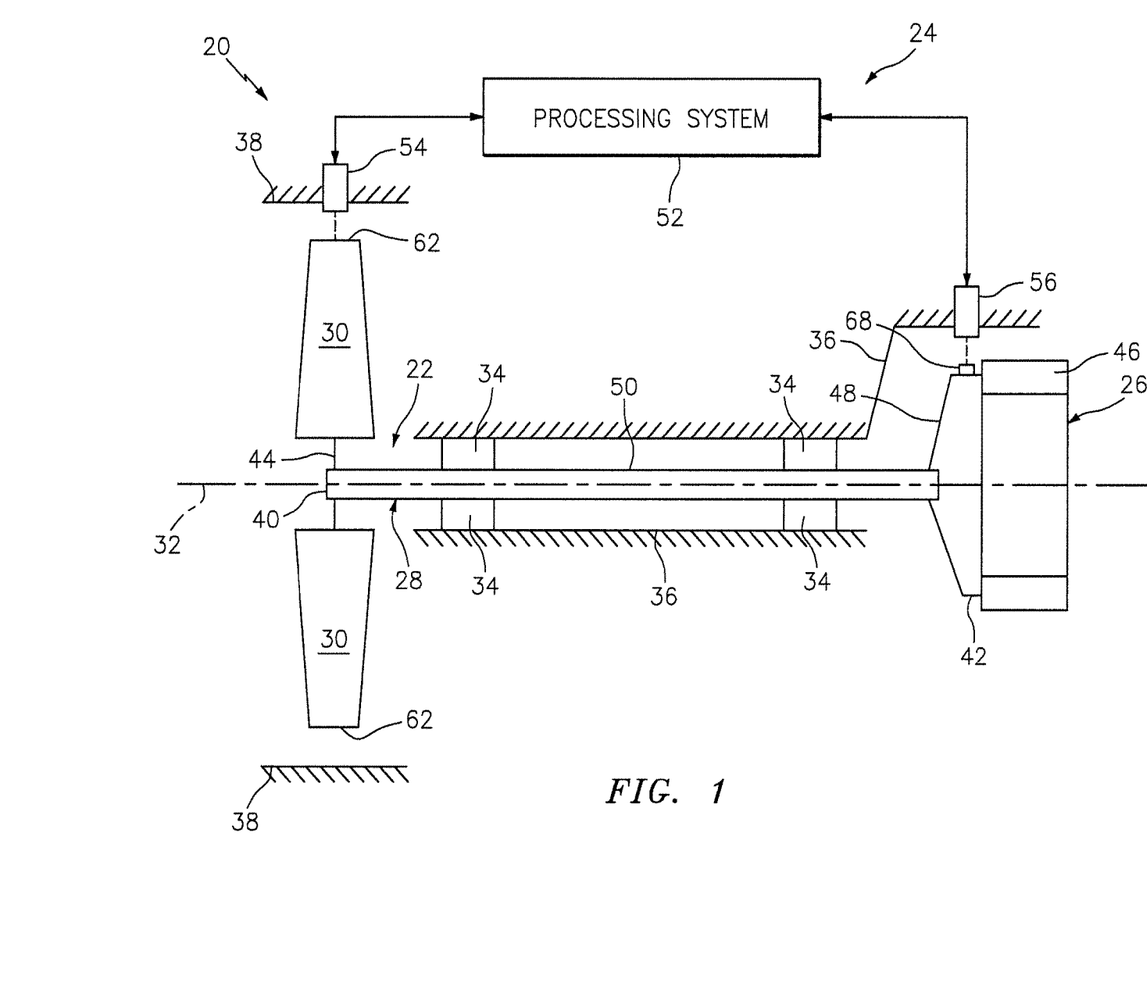
FIG. 1 is a schematic illustration of a rotational system.

FIG. 1 is a schematic illustration of a rotational system 20. This rotational system 20 may be configured as a geared turbine engine as described below in further detail. Alternatively, the rotational system 20 may be configured as, a three spool turbine engine, a non-geared turbine engine, a turboprop engine, a propfan engine, a wind turbine, a hydro-electric turbine, an aerospace or nautical system that includes a propeller, or any other piece of rotational equipment.

The rotational system 20 includes a rotor assembly 22 and a monitoring system 24. The rotational system 20 of FIG. 1 also includes a gear train 26; however, this gear train may be omitted in other embodiments.

The rotor assembly 22 includes a shaft 28 and a plurality of rotor blades 30. The shaft 28 is adapted to transfer torque from the gear train 26, or another component of the rotational system 20, to the rotor blades 30.

The shaft 28 is rotatable about an axial centerline 32. The shaft 28, for example, is rotatably supported by one or more bearings 34; e.g., rolling element bearings. These bearings 34 are discretely located along the shaft 28 and connected to at least one stationary structure 36 such as, for example, an annular support strut. The stationary structure 36 may be directly or indirectly connected to a case 38 of the rotational system 20, where the case 38 may circumscribe and house the rotor blades 30.

The shaft 28 extends axially along the centerline 32 between a first end 40 and a second end 42. The first end 40 may be a forward and/or upstream shaft end and the second end 42 may be an aft and/or downstream shaft end, or vice versa depending upon the particular configuration of the rotational system 20.

Figure 2:
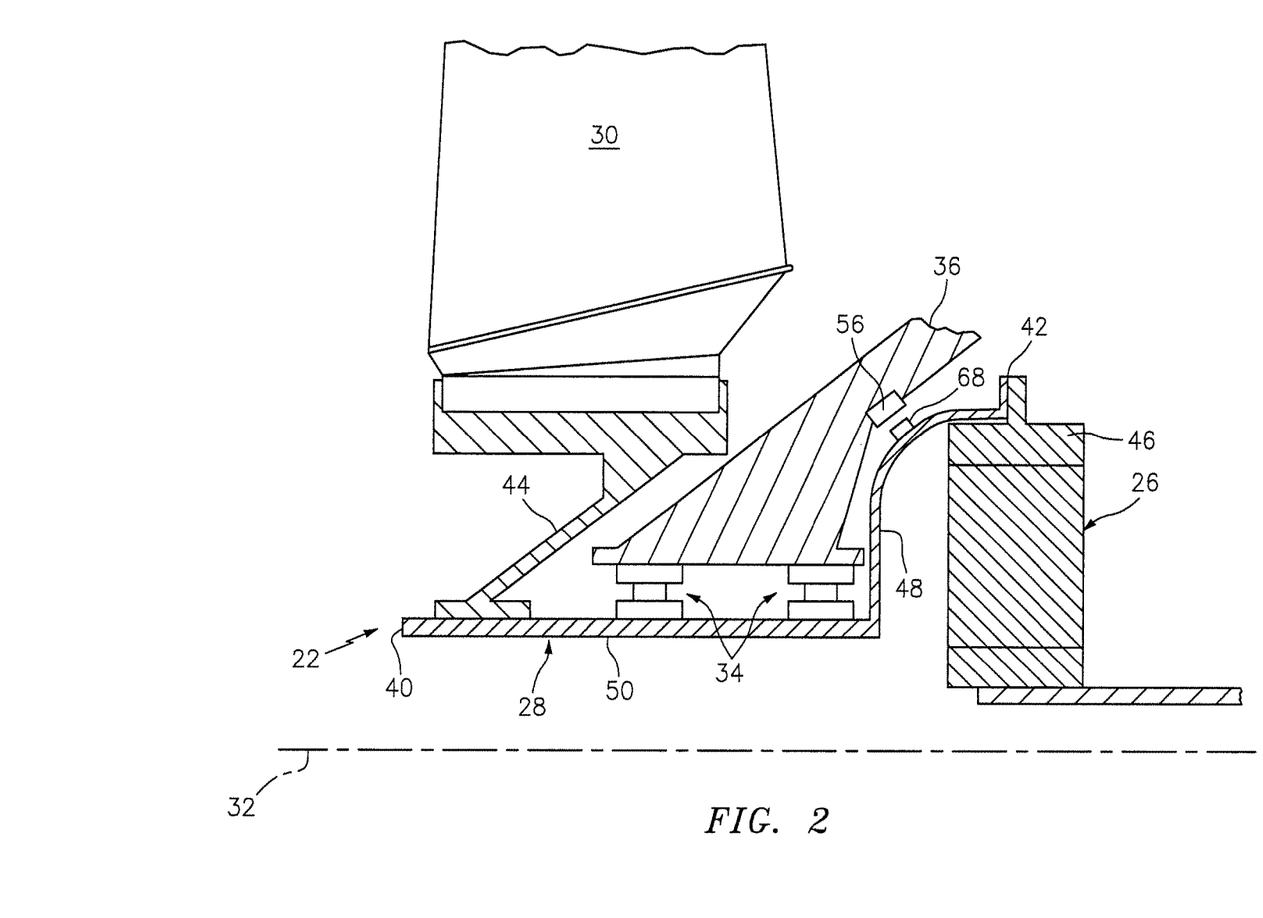
FIG. 2 is a side sectional diagrammatic illustration of a portion of the rotational system of FIG. 1.

Referring to FIGS. 1 and 2, the rotor blades 30 are arranged around and may be connected to the shaft 28 at (e.g., on, adjacent or proximate) the first end 40. The rotor blades 30, for example, may be mechanically fastened, welded, brazed, adhered or otherwise attached to a rotor disk 44 that is connected to the shaft 28. Alternatively, the rotor blades 30 may be formed integral with the rotor disk 44. Each rotor blade 30 may be configured as a fan blade of the rotational system 20 (e.g., geared turbine engine). Alternatively, each rotor blade 30 may be configured as a compressor blade or a turbine blade of the rotational system 20.

Referring to FIG. 2, the gear train 26 may be configured as an epicyclic gear train, or any other type of gear train or transmission. A portion 46 of the gear train 26 such as, for example, a ring gear is attached to the shaft 28 by an interface 48 at (e.g., on, adjacent or proximate) the second end 42. The interface 48 may be configured as part of and/or formed integral with the shaft 28. The interface 48 of FIG. 2, for example, is configured as a bowl-shaped tubular end portion of the shaft 28 that extends radially and/or axially out from a cylindrical portion 50 of the shaft 28. The interface 48, however, may alternatively be configured as part of and/or foamed integral with the gear train portion 46. Still alternatively, the interface 48 may be configured as one or more fasteners (e.g., bolts, studs, etc.) that attach the shaft 28 to the gear train portion 46.

Referring to FIG. 1, the monitoring system 24 includes a processing system 52 and a blade sensor 54 (also sometimes referred to as a blade timing or position sensor), which sensor may be mounted with the case 38 and axially aligned with the rotor blades 30. The monitoring system 24 of FIG. 1 also includes a shaft sensor 56 (also sometimes referred to as a shaft timing or position sensor), which sensor may be mounted with the stationary structure 36 and located at the interface 48; e.g., axially aligned with the interface 48 proximate the second end 42 and the gear train 26.

Figure 3:
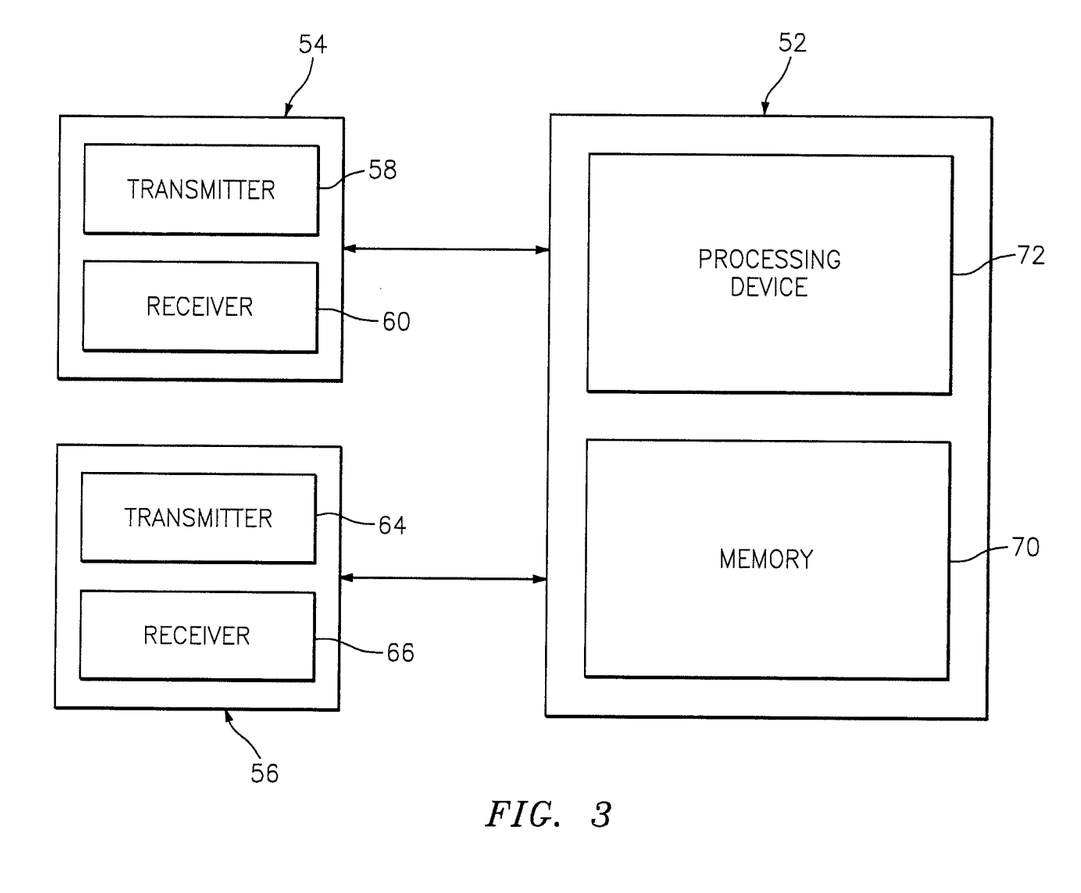
FIG. 3 is a block diagram illustration of a monitoring system of the rotational system of FIG. 1.

Referring to FIGS. 1 and 3, the blade sensor 54 is configured as a time of arrival sensor such as, for example, a blade tip time of arrival sensor. The blade sensor 54 may also be configured as a non-contact sensor. The blade sensor 54, for example, may include a signal transmitter 58 (e.g., an emitter such as a light source) and a signal receiver 60 (e.g., a detector). The transmitter 58 may be adapted to direct focused or unfocused light (e.g., a laser beam, white light, etc.) radially towards the rotor blades 30 and the centerline 32. The receiver 60 may be adapted to measure a quantity of the light that is reflected radially back towards the blade sensor 54 from at least a first of the rotor blades 30 and, more particularly, a tip 62 of the first rotor blade 30. Of course, in other embodiments, the transmitter 58 and the receiver 60 may alternatively be configured as a single unit such as, for example, a proximity sensor, a coil, a magnetometer, a capacitive sensor, a microwave sensor, etc.

The shaft sensor 56 may be configured as a shaft revolution and/or speed sensor such as, for example, a once per revolution sensor. The shaft sensor 56 may also be configured as a non-contact sensor. The shaft sensor 56, for example, may include a signal transmitter 64 (e.g., a light source) and a signal receiver 66 (e.g., a detector). The transmitter 64 may be adapted to direct focused or unfocused light (e.g., a laser beam, white light, etc.) radially towards the shaft 28 and the centerline 32. The receiver 66 may be adapted to measure a quantity of the light that is reflected radially back towards the shaft sensor 56 from a reference point 68 (e.g., a marker, a protrusion or an indentation) on the interface 48.

The processing system 52 may be configured for onboard (e.g. in-flight) use of the rotational system 20 (e.g., the geared turbine engine). The processing system 52, for example, may be in signal communication (e.g., hardwired or wirelessly connected) with or integrated into an onboard controller of the rotational system 20 or an associated aircraft or vessel. Alternatively, the processing system 52 may be configured for use of the rotational system 20 on a test stand or in an industrial application; e.g., a power plant application.

The processing system 52 is in signal communication with the blade sensor 54 and the shaft sensor 56. The processing system 52 may be implemented with a combination of hardware and software. The hardware includes memory 70 and a processing device 72, which includes one or more single-core and/or multi-core processors. The hardware may also or alternatively include analog and/or digital circuitry other than that described above.

The memory 70 is configured to store software (e.g., program instructions) for execution of one or more methods, such as that described below, by the processing device 72. The memory 70 may be a non-transitory computer readable medium. The memory 70 may include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
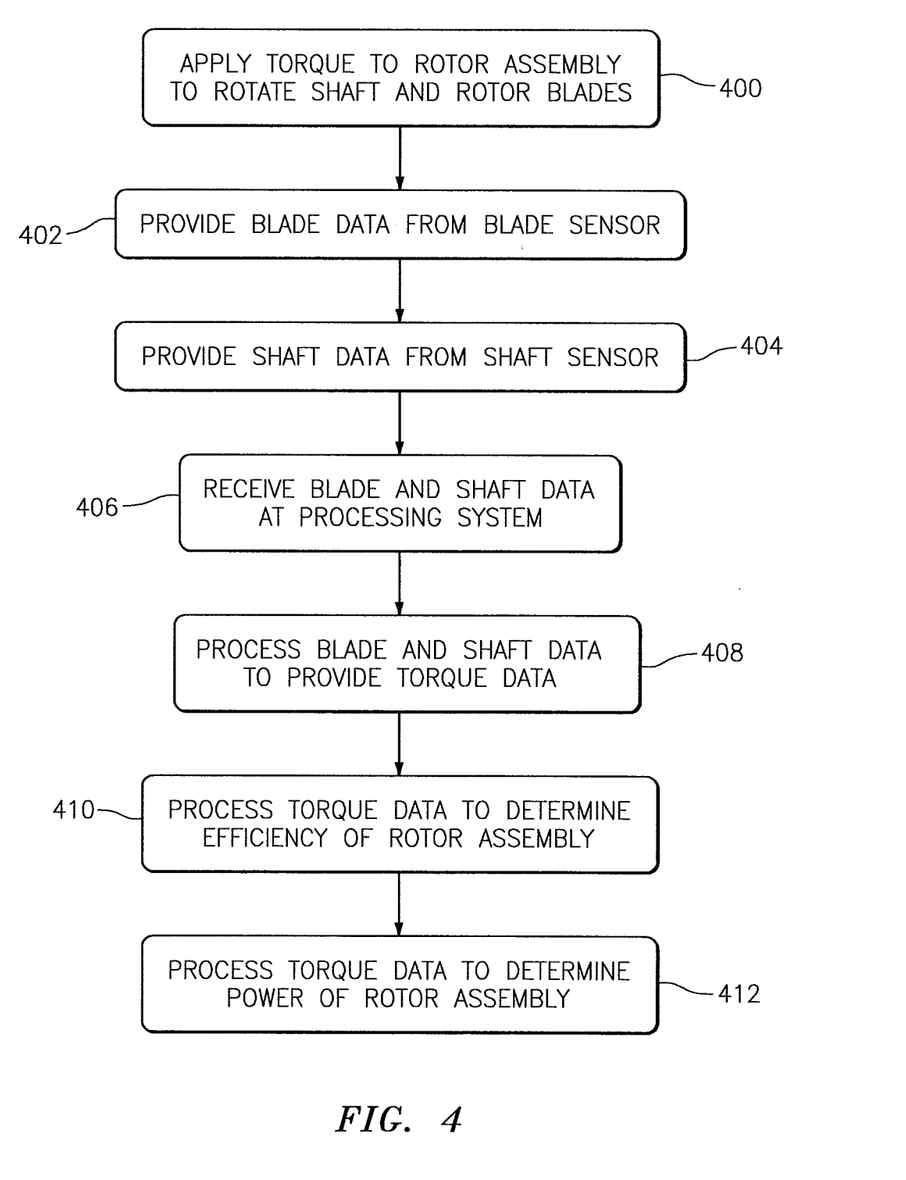
FIG. 4 is a flow diagram of a method for monitoring one or more dynamic parameters of a rotor assembly included in the rotational system of FIG. 1.

FIG. 4 is a flow diagram of a method for monitoring one or more dynamic parameters of the rotational system 20 and, more particularly, of the rotor assembly 22 of FIGS. 1-3. An example of a dynamic parameter is the torque transferred by the shaft 28 from the gear train 26 to the rotor blades 30; e.g., a torque to which the rotor assembly 22 is being subjected during either in-flight or test stand operation. Another example of a dynamic parameter is efficiency of the rotor assembly 22; e.g., a ratio of work used to rotate the rotor assembly 22 versus thrust generated by the rotor assembly 22. Still another example of a dynamic parameter is power (e.g., horsepower) of the rotating rotor assembly 22. It should be noted, while the dynamic parameter examples provided above and the description of the method below may refer to the rotational system 20 as an aircraft turbine engine, the method of FIG. 4 is not limited to such a rotational system configuration.

In step 400, the rotational system 20 is operated. The gear train 26, for example, applies torque to the shaft 28 causing the shaft 28 and the rotor blades 30 to rotate about the centerline 32. This torque may cause the shaft 28 to windup; e.g., torsionally twist. The torque may also or alternatively cause one or more of the rotor blades 30 to angularly deflect.

In step 402, the blade sensor 54 provides blade data to the processing system 52. The transmitter 58 (e.g., a laser diode), for example, directs a laser beam towards the rotor blades 30. The receiver 60 (e.g., a CMOS detector) measures a quantity of the laser light reflected by the tip 62 of at least the first rotor blade 30, or the tips 62 of multiple rotor blades 30. The blade sensor 54 subsequently generates the blade data based on the measured quantity of reflected laser light.

The blade data is indicative of a rotational position of the tip 62 of at least the first rotor blade 30 at a particular time. For example, the blade data may include a digital series (or an analog stream) of receiver 60 outputs (e.g., voltages) that correspond to the measured quantity of reflected laser light as the rotor blades 30 rotates about the centerline 32. Each of these receiver 60 outputs corresponds to a respective time (e.g., time step) during the rotation of the rotor blades 30 at which the tip 62 of a respective one of the rotor blades 30 passed the blade sensor 54, where the blade sensor 54 is located at a known angular position.

In step 404, the shaft sensor 56 provides shaft data (also known as "timing data") to the processing system 52. The transmitter 64 (e.g., a laser diode), for example, directs a laser beam towards the shaft 28. The receiver 66 (e.g., a CMOS detector) measures a quantity of the laser light reflected by the reference point 68. The shaft sensor 56 subsequently generates the shaft data based on the measured quantity of reflected laser light.

The shaft data is indicative of a rotational position of the reference point 68 at a particular time. For example, the shaft data may include a digital series (or an analog stream) of receiver 66 outputs (e.g., voltages) that correspond to the measured quantity of reflected laser light as the shaft 28 rotates about the centerline 32. Each of these receiver 66 outputs corresponds to a respective time (e.g., time step) during the rotation of the shaft 28 at which the reference point 68 passed the shaft sensor 56, where the shaft sensor 56 is located at a known angular position.

In step 406, the processing system 52 receives the blade data from the blade sensor 54, for example, in real time; e.g., during rotational system 20 operation. The processing system 52 also receives the shaft data from the shaft sensor 56, for example, in real time.

In step 408, the processing system 52 processes the shaft data with the blade data to provide torque data, which is indicative of the torque being applied to at least a portion or all of the rotor assembly 22 by the gear train 26. The processing system 52, for example, determines an estimated time of arrival of the tip 62 of at least the first rotor blade 30 at the location of the blade sensor 54 from the shaft data using known methodologies. The processing system 52 also determines the actual time of arrival of the tip 62 of at least the first rotor blade 30 at the location of the blade sensor 54 from the blade data using known methodologies.

The processing system 52 compares the estimated time of arrival with the actual time of arrival to determine the torque being applied to the rotor assembly 22 by the gear train 26. The processing system 52, for example, may process the estimated time of arrival and the actual time of arrival within a torque algorithm. An example of an equation for such an algorithm is as follows:

$$\text{Torque} = |(\text{Actual Time of Arrival}) - (\text{Estimated Time of Arrival})| * C$$

where "C" is a constant or alternatively a variable. It can be seen therefore that the torque is directly proportional to an absolute value of the difference between the estimated time of arrival and the actual time of arrival. Thus, as the difference between the estimated time of arrival and the actual time of arrival increases, the torque increases and vice versa. It can also be seen that as deflection of the tip 62 of the first rotor blade 30 increases and/or as shaft 28 windup (e.g., torsional twisting) increases, the torque also increases. Of course, in other embodiments, various equations other than that provided above may be used to determine the torque.

In step 410, the processing system 52 processes the torque data to determine the efficiency of the rotor assembly 22. The efficiency may be determined, for example, using the following equation:

$$\text{Efficiency} = (T * V_1) / (\tau * V_2)$$

where "T" is thrust produced by the rotational system 20 (e.g., turbine engine), "$V_1$" is velocity of fluid moved by the rotor assembly 22, "$\tau$" is the torque being applied to at least a portion or all of the rotor assembly 22 by the gear train 26, and "$V_2$" is the angular velocity of the shaft 28. The thrust "T", the velocity "$V_1$" and/or the angular velocity "$V_2$" may each be (i) derived from, for example, data provided by the blade sensor 54 and/or additional sensor(s) using a lookup table, (ii) determined directly from one or more additional sensors, etc. Of course, in other embodiments, various equations other than that provided above may be used to determine the efficiency. For example, in another embodiment, the efficiency may be determined using the following equation:

$$\text{Efficiency} = F_{fan} * (E_1 - E_2) / [(\tau * V_2) - (F_{core} * (E_3 - E_4))]$$

where "$F_{fan}$" is mass flow of air through a turbine engine fan section, "$E_1$" is enthalpy aft of a turbine engine fan, "$E_2$" is ideal enthalpy forward of the turbine engine fan, "$F_{core}$" is mass flow of air through a turbine engine core, "$E_3$" is enthalpy aft of the turbine engine fan at an inlet to a low pressure compressor, and "$E_4$" is enthalpy at an inlet to a core of the turbine engine fan for the air that flows into the low pressure compressor.

In step 412, the processing system 52 processes the torque data to determine the power (e.g., horsepower) of the rotor assembly 22. The power may be determined, for example, using the following equation:

$$\text{Power} = \tau * V_2.$$

Of course, in other embodiments, various equations other than that provided above may be used to determine the power.

The monitoring system 24 may include various components and may have various configurations other than those described above. For example, in some embodiments, the blade sensor 54 and/or the shaft sensor 56 may have an alternate configuration. One of more of the blade and shaft sensors 54 and 56, for example, may each be configured as a radio or proximity sensor that directs radio (e.g., radar) waves respectively towards the rotor blades 30 or shaft 28, and measures frequency and/or phase modulation induced by the rotor blades 30 or the reference point 68 during rotor assembly 22 rotation. In another example, each sensor 54 and/or 56 may be configured as an eddy current, inductive and/or capacitance sensor, etc. In some embodiments, the blade sensor 54 may be located in front of or in back of the rotor blades 30. In some embodiments, the monitoring system 24 may include a plurality of blade sensors 54 located circumferentially around the centerline 32. In some embodiments, the shaft sensor 56 may be located at another axial position along the shaft 28 other than at the second end 42. In some embodiments, the monitoring system 24 may omit the shaft sensor 56. The shaft data for one or more operating points and/or conditions, for example, may be stored in a lookup table in the memory before operation of the turbine engine. Data from the blade sensor 54 and/or additional sensor(s) may then be processed in real time to determine the engine operating point and/or condition(s) and subsequently used to derive the shaft data from the lookup table.

Figure 5:
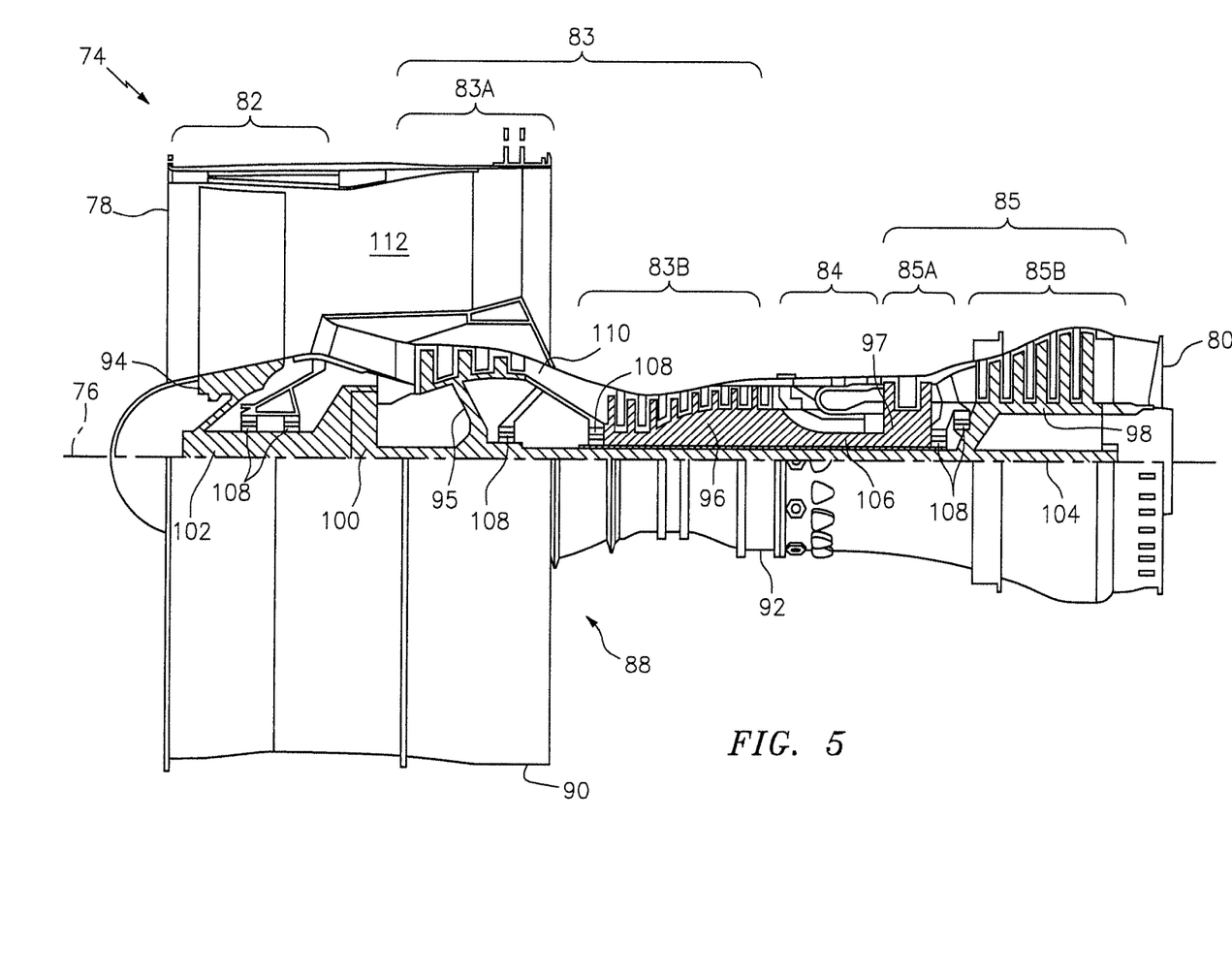
FIG. 5 is a side cutaway illustration of a geared turbine engine.

FIG. 5 is a side cutaway illustration of a geared turbine engine 74 that extends along an axial centerline 76 between an upstream airflow inlet 78 and a downstream airflow exhaust 80. The turbine engine 74 includes a fan section 82, a compressor section 83, a combustor section 84 and a turbine section 85. The compressor section 83 includes a low pressure compressor (LPC) section 83A and a high pressure compressor (HPC) section 83B. The turbine section 85 includes a high pressure turbine (HPT) section 85A and a low pressure turbine (LPT) section 85B. The engine sections 82-85 are arranged sequentially along the centerline 76 within an engine housing 88, which includes a first engine case 90 within a fan nacelle (not shown) and a second engine case 92 within a core nacelle.

Each of the engine sections 82, 83A, 83B, 85A and 85B includes a respective rotor 94-98. Each of the rotors 94-98 includes a plurality of rotor blades arranged circumferentially around and connected to one or more respective rotor disks. The fan rotor 94 is connected to a gear train 100 through a fan shaft 102. The gear train 100 and the LPC rotor 95 are connected to and driven by the LPT rotor 98 through a low speed shaft 104. The HPC rotor 96 is connected to and driven by the HPT rotor 97 through a high speed shaft 106. The fan shaft 102, the low speed shaft 104 and the high speed shaft 106 are rotatably supported by a plurality of bearings 108. Each of these bearings 108 is connected to the second engine case 92 by at least one stationary structure such as, for example, an annular support strut.

Air enters the turbine engine 74 through the airflow inlet 78, and is directed through the fan section 82 and into an annular core gas path 110 and an annular bypass gas path 112. The air within the core gas path 110 may be referred to as "core air". The air within the bypass gas path 112 may be referred to as "bypass air". The core air is directed through the engine sections 83-85 and exits the turbine engine 74 through the airflow exhaust 80. Within the combustor section 84, fuel is injected into and mixed with the core air and ignited to provide forward engine thrust. The bypass air is directed through the bypass gas path 112 and out of the turbine engine 74 to provide additional forward engine thrust, or reverse engine thrust via a thrust reverser (not shown).

In some embodiments, the rotor blades 30 and the rotor disk 44 of FIG. 1 may be included as part of the fan rotor 94. The shaft 28 may be configured as the fan shaft 102. The gear train 26 may be configured as the gear train 100. In other embodiments, the rotor blades 30 and the rotor disk 44 of FIG. 1 may be includes as part of one of the rotors 95-98. The shaft 28 may be configured as a respective one of the shafts 104 and 106. The gear train 26 may be configured as the gear train 100, or the shaft 28 may receive the torque from another component of the turbine engine 74.

The rotor assembly 22 and the monitoring system 24 may be included in various turbine engines other than the one described above as well as in other types of rotational equipment as described above. The rotor assembly 22 and the monitoring system 24, for example, may be included in a geared turbine engine where a gear train connects one or more shafts to one or more rotors in a fan section, a compressor section and/or any other engine section. Alternatively, the rotor assembly 22 and the monitoring system 24 may be included in a turbine engine configured without a gear train. The rotor assembly 22 and the monitoring system 24 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A system for a turbine engine, the system comprising:
   a rotor assembly including a plurality of rotor blades connected to a shaft; and
   a monitoring system including a processing system adapted to
     receive blade data indicative of a rotational position of at least a first of the rotor blades; and
     process shaft data with the blade data to provide torque data indicative of a torque to which at least a portion of the rotor assembly is being subjected, wherein the shaft data is indicative of a rotational position of the shaft.

2. The system of claim 1, wherein
the processing system is adapted to determine an estimated time of arrival for the first of the rotor blades from the shaft data; and
the processing system is adapted to dete imine an actual time of arrival for the first of the rotor blades from the blade data.

3. The system of claim 2, wherein
the processing system is adapted to compare the estimated time of arrival with the actual time of arrival to provide the torque data; and
the torque is directly proportional to a difference between the estimated time of arrival and the actual time of arrival.

4. The system of claim 1, wherein the processing system is adapted to process the torque data to determine efficiency and/or horsepower of the rotor assembly.

5. The system of claim 1, further comprising:
a gear train connected to the rotor assembly;
wherein the shaft transfers the torque from the gear train to the rotor blades.

6. The system of claim 5, wherein
the monitoring system includes a shaft sensor that provides the shaft data; and
the shaft sensor is located at an interface between the shaft and the gear train.

7. The system of claim 1, wherein the monitoring system includes a non-contact sensor that provides the shaft data.

8. The system of claim 1, wherein the monitoring system includes a once per revolution sensor that provides the shaft data.

9. The system of claim 1, wherein the monitoring system includes a memory in which the shaft data is stored.

10. The system of claim 1, wherein the monitoring system includes a blade sensor that provides the blade data.

11. The system of claim 10, further comprising:
a case housing the rotor blades;
wherein the blade sensor is mounted with the case.

12. The system of claim 10, wherein the blade sensor comprises a non-contact sensor.

13. The system of claim 10, wherein the blade sensor comprises a blade tip time of arrival sensor.

14. The system of claim 1, wherein the rotor blades comprise fan blades of the turbine engine.

15. A monitoring system for a rotor assembly including a plurality of rotor blades arranged around and connected to a shaft, the monitoring system comprising:
a blade sensor that provides blade data indicative of a rotational position of at least a first of the rotor blades; and
a processing system that processes shaft data with the blade data to provide torque data indicative of a torque to which at least a portion of the rotor assembly is being subjected;
wherein the shaft data is indicative of a rotational position of the shaft.

16. The monitoring system of claim 15, wherein the processing system
processes the shaft data to determine an estimated time of arrival for the first of the rotor blades;
processes the blade data to determine an actual time of arrival for the first of the rotor blades; and
compares the estimated time of arrival with the actual time of arrival to determine the torque data.

17. The monitoring system of claim 15, wherein the processing system processes the torque data to determine efficiency and/or horsepower of the rotor assembly.

18. The monitoring system of claim 15, further comprising a shaft sensor that provides the shaft data.

19. A method involving a rotor assembly comprising a plurality of rotor blades connected to a shaft, the method comprising:
rotating the shaft and the rotor blades about a centerline of the shaft;
receiving blade data indicative of a rotational position of at least a first of the rotor blades; and
processing shaft data with the blade data to provide torque data indicative of a torque to which at least a portion of the rotor assembly is being subjected during operation, wherein the shaft data is indicative of a rotational position of the shaft.

20. The method of claim 19, further comprising processing the torque data to determine efficiency of the rotor assembly, wherein the rotor blades comprise fan blades of a geared turbine engine in which the rotor assembly is included.

* * * * *